May 18, 1937.  H. A. HICKS ET AL  2,080,714
BODY STRUCTURE
Filed Dec. 14, 1934  3 Sheets-Sheet 1
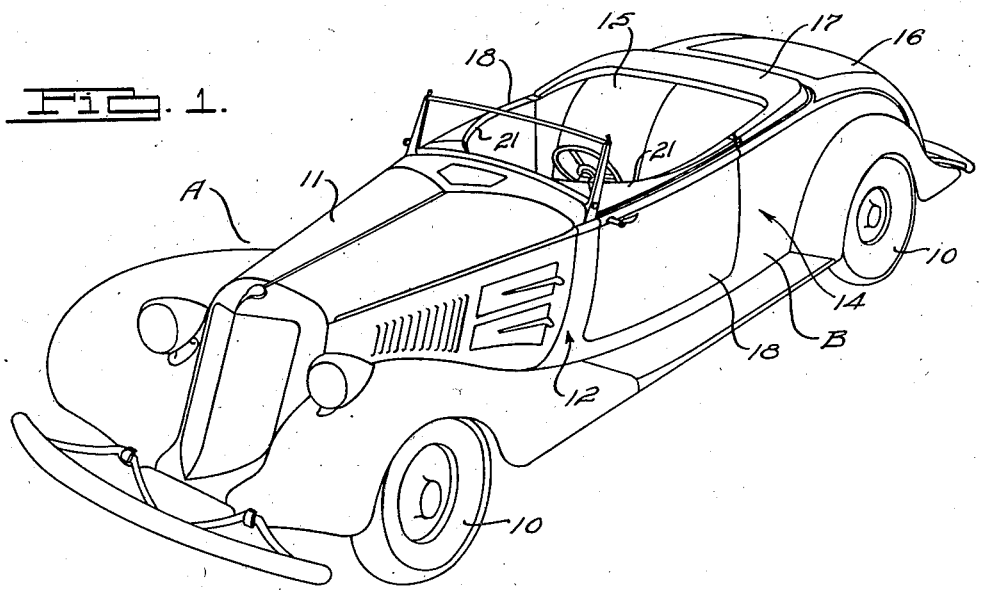
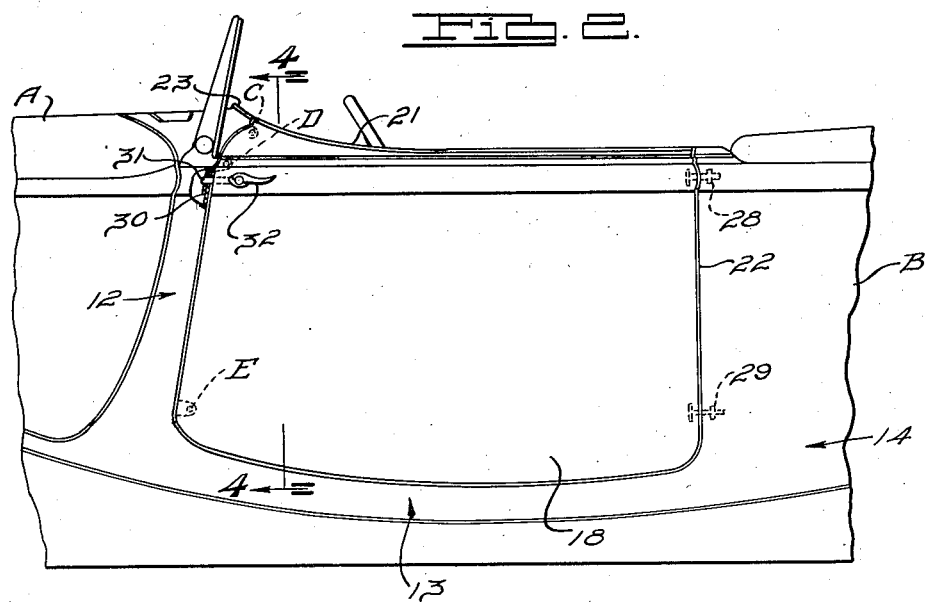
INVENTORS.
HAROLD A. HICKS
ALEXANDER G. HERRESHOFF
BY ARTHUR A. BUCHNER
Harness, Lind, Patee & Harris
ATTORNEYS.

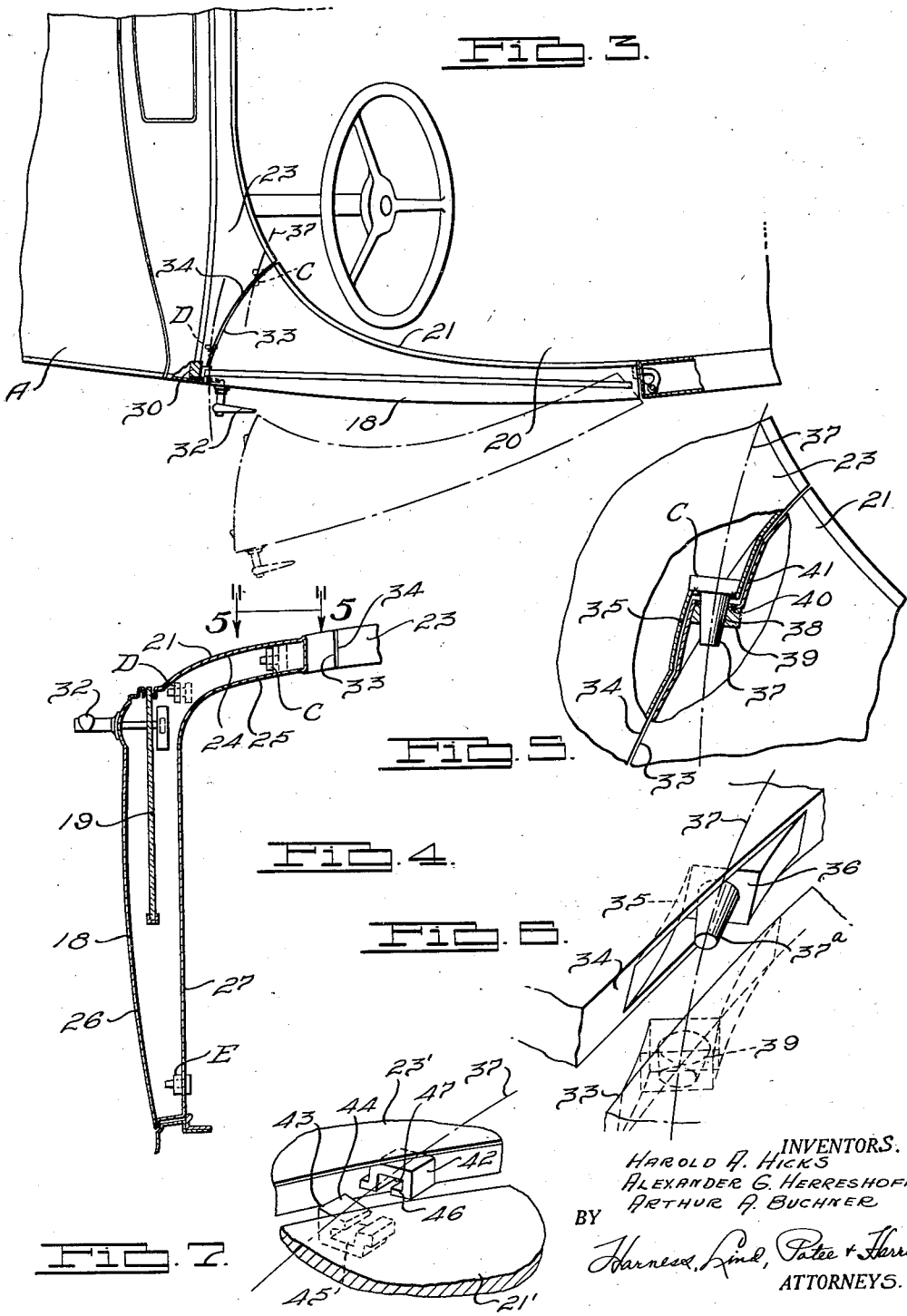

May 18, 1937. H. A. HICKS ET AL 2,080,714
BODY STRUCTURE
Filed Dec. 14, 1934 3 Sheets-Sheet 3
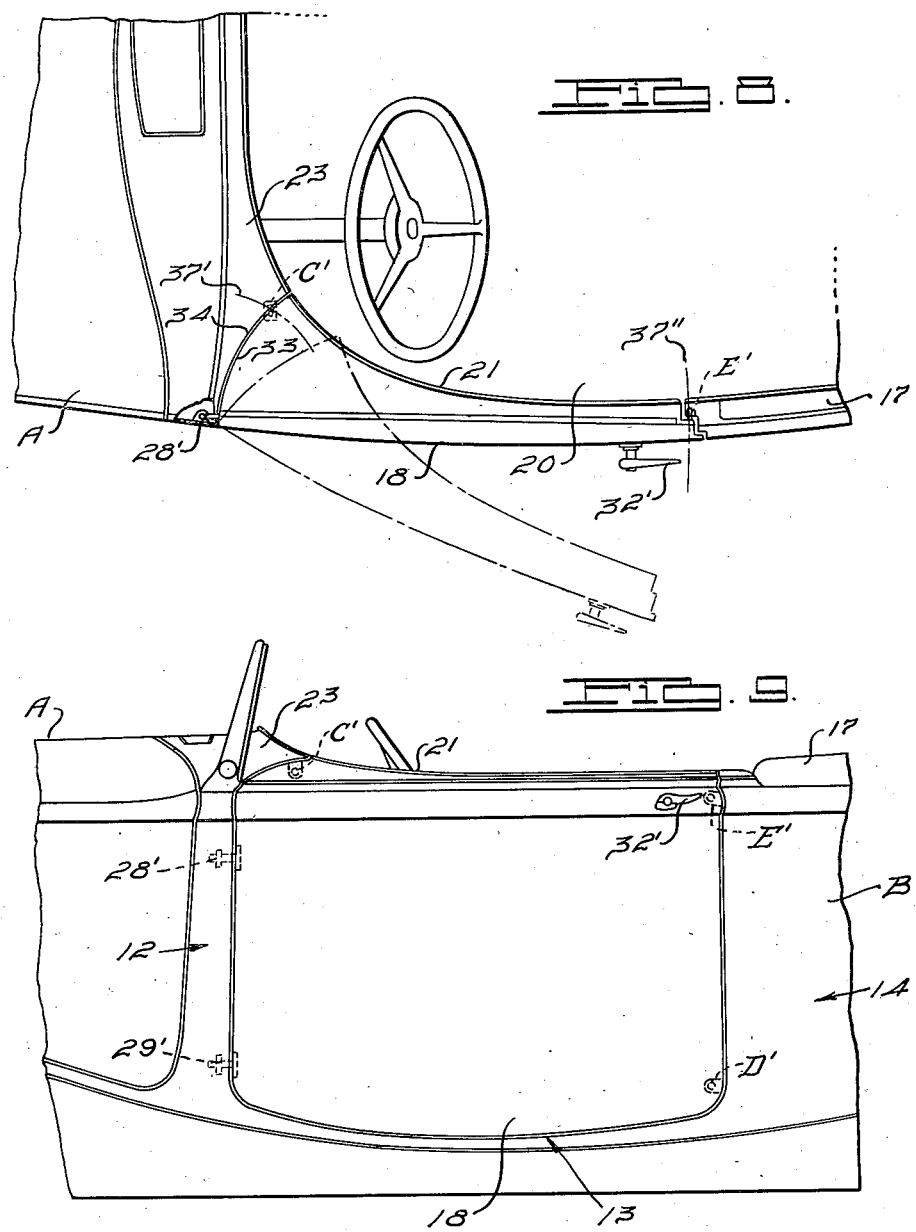
INVENTORS.
HAROLD A. HICKS
ALEXANDER G. HERRESHOFF
BY ARTHUR A. BUCHTER
ATTORNEYS.

Patented May 18, 1937

2,080,714

UNITED STATES PATENT OFFICE 2,080,714

BODY STRUCTURE

Harold A. Hicks, Detroit, Alexander G. Herreshoff, Grosse Pointe, and Arthur A. Buchner, Detroit, Mich., assignors to Chrysler Corporation, Detroit, Mich., a corporation of Delaware Application December 14, 1934, Serial No. 757,472

12 Claims. (Cl. 296—44)

This invention relates to vehicle body structures and refers more particularly to improvements in body structures of motor vehicles.

More specifically our invention has particular reference to body structures of the "open" types as distinguished from the "sedan" or similar closed types although our invention may, if desired, be used to advantage in any type and style of vehicle body.

One type of open body is the well known convertible coupe and it is recognized that such type of body, and other open types, present far less rigidity than the sedan types of body structures, especially when the tops are down or off the body. In the conventional types of sedan or closed body structures the roof panel and body superstructure acts as a shear panel and considerably augments the body frame not only in resistance to loads but also in providing restraint at such a great distance from the center of mass that periodic vibration is eliminated, or favorably diminished.

However, in the conventional convertible body types, for example, with the top down there is no lateral restrain in the open body sections as no diagonal bracing is possible owing to the seating space which must be kept clear of obstructions and therefore it has been considered to be impossible or impracticable to eliminate or desirably reduce the lateral and longitudinal movements between the usual body cowl section and the section to the rear of the seat. The conventional doors of constant or nearly constant width provide little or no lateral resistance.

It is an object of our invention to provide an improved open body structure, such as the convertible coupe type for example, constructed to provide the desired lateral and longitudinal restraint to objectionable relative movement between the cowl and rear sections; to provide a practicable rigid open body structure favorably comparing in its rigidity to the sedan body types; and to provide an improved open body structure which will not objectionably weave or distort under normal conditions of usage whereby the body will have a longer life and provide a greater degree of comfort to the passengers than is possible with known structures.

A further object of our invention is to provide an improved body structure of the character aforesaid wherein the side door or doors are constructed to provide a rigid stressed connecting means between the body sections in restraining their relative movements.

Another object of our invention is to provide a door structure of the aforesaid character which will provide a constructive diagonal bracing between said structures.

Further objects and advantages of our invention will be more apparent hereinafter, reference being had to the accompanying drawings illustrating one embodiment of our invention and in which:

Fig. 1 is a front perspective view of a motor vehicle embodying our improved body structure.

Fig. 2 is a side elevational view of a portion of the body structure shown in Fig. 1.

Fig. 3 is a top plan view of a portion of the body structure in the vicinity of one of the side doors.

Fig. 4 is a sectional elevational view along the line 4—4 of Fig. 2.

Fig. 5 is a detail plan view of a portion of the body structure, the view being taken as indicated by the line 5—5 of Fig. 4.

Fig. 6 is a fragmentary perspective view of the fastener shown in Fig. 5 with the door partly open.

Fig. 7 is a perspective view similar to Fig. 6 but illustrating a modified type of fastener.

Fig. 8 is a view similar to Fig. 3 but illustrating a modified door hinging arrangement.

Fig. 9 is a view similar to Fig. 2 but further illustrating the Fig. 8 modified arrangement.

In the drawings reference character A represents the motor vehicle having the open type body structure B illustrated as the convertible coupe type for the purpose of explaining the principles of our invention. The vehicle A has the usual ground wheels 10 and engine hood 11. The body structure B is provided with the transversely extending forward cowl section 12 connected at each side through the lonigtudinal side structures 13 and the usual chassis frame (not shown), where a frame is employed, to the rear section 14 which is constructed in the well known manner to receive the seat backs 15. The rear section carries the rear deck structure 16 and accommodates the demountable folding top 17, when not in use, between seats 15 and deck 16 in the well known or other preferred manner. If desired the vehicle need not carry a top.

In order to utilize side door structures to brace the sections 12 and 14 most effectively, we preferably provide a door 18 at each side of body B between sections 12 and 14. Each door 18 may be of suitable hollow metal structure adapted to provide the required rigid connecting member and, when the top 17 is moved into operative position, the window glass 19 may be raised in the usual manner to complete the enclosure for the passenger compartment 20.

Each door preferably has its upper face structurally flaring forwardly and inwardly at 21 from the vertical door receiving face 22 of section 14 to meet the laterally outwardly and rearwardly flaring shelf-like bracing structure 23 of the cowl section 12. From Fig. 4 it will be noted that the inwardly extending forwardly flared portion 21 of door 18 may be formed with upper and lower panels 24 and 25 respectively fashioned as continuations of the outer and inner panels 26, 27 of door 18. The rearwardly overhanging cowl bracing 23 may be constructed similar to the door portion 21 or otherwise as may be desired.

The door 18 may be hinged to either section 12 or 14, preferably to the latter by hinges 28, 29 of any suitable type capable of forming a swinging connection without permitting relative movement when the door is closed. When the door is closed, the post or column structure 30 of cowl section 12 is adapted to receive the latch bolt 31 operably by a handle control 32.

The flared portions 21 and 23 of the door and cowl structures respectively have complementary meeting edges or faces 33, 34 preferably struck as an arc of much less radius than the distance therefrom to the axis of hinges 28, 29 whereby the cowl portion 34 provides an abutment for the door portion 33 when the door is closed.

In order to securely releasably connect the body sections 12 and 14 through door 18 when closed, the meeting portions of the door and cowl section 12 are provided at a plurality of points or locations with C, D and E with fasteners which rigidly connect the door and cowl against relative movements longitudinally and laterally as well as vertically.

A typical fastener is illustrated in Figs. 5 and 6 at the point C. The face 34 is provided with a recess 35 to form an abutment 36 perpendicular to the arc 37 which has its center at the axis of hinges 28, 29. Secured to abutment 36, as by welding thereto, is a conical cone or tapered male member 37ª adapted to tightly fit the correspondly tapered hole 38 of the companion female member 39 likewise welded to the rear face of abutment 40 formed by the recess 41. The faces or abutments 36 and 40 thus lie across the meeting faces 34 and 33, each abutment projecting into the recess of the companion structure when the door carries the member 39 along the path of arc 37 from the Fig. 6 position to the Fig. 5 position. If desired, the member 37ª may be carried by the door and member 39 by the cowl section as will be readily apparent, or the hinges may be located at the cowl column 30 with the fasteners appropriately secured at the swinging end of the doors preferably with at least one of the fasteners at location C. Such arrangement is shown in Figs. 8 and 9.

It will be understood that a similar fastener structure is employed at points D and E so that when the door is closed the body sections 12 and 14 are structurally rigidly connected. Thus, the door 18 provides, in effect, diagonal braces between 28 and E and also between 29 and D. The laterally flared overhanging portions 21 and 23 provide a cockpit-like structure for the passenger space 20 and form a constructive diagonal bracing as viewed in Fig. 3 between the body sections 12 and 14 whereby to increase the torsional rigidity of the vehicle structure as a whole.

A corresponding door is preferably similarly associated with the cowl section 12 and rear section 14 on the right hand side of the motor vehicle.

In Fig. 7 we have illustrated a slightly differing type of fastener which may be used at points C, D and E. Thus, the corresponding structures 23' and 21' respectively carry the female and male fastener members 42 and 43. The latter member has a flat wedge plate male portion 44 overhanging the opening 45. The member 42 has a projection 46 adapted to enter opening 45, the projection 46 underhanging the tapered recess 47 adapted to snugly receive the wedge plate 44 when the door is swung closed along arc 37. Other suitable types of fasteners may be used if desired.

Referring now to Figs. 8 and 9 the parts are generally of the same construction and operation as before described but the fasteners and hinges are rearranged so that the door 18' is hinged at 28' and 29' to the aforesaid body section 12. The fasteners of the Fig. 6 type, for example, are preferably located at the generally designated points C', D' and E'. The door handle for the latch control is shown at 32'. Since the door 18' swings on hinges 28', 29' the fasteners are, of course, arranged to engage along the arcs 37' for the fastener at C' and along arc 37'' for the fasteners at E' and D' as will be readily understood.

Various modifications and changes will be apparent from the teachings of our invention, as set forth in the appended claims, and it is not out intention to limit our invention to the particular details of construction and operation shown and described for illustrative purposes.

We claim:

1. In an open type body structure having a forward cowl section and a rear section, a door adapted to structurally connect said sections, means for hinging said door at one end thereof to one of said sections, means releasably connecting said door at its other end to the other of said sections, said door having an inwardly extending bracing portion at one end, and means for releasably connecting said door bracing portion with one of said sections when said door is closed so constructed and arranged as to torsionally brace said body sections against relative deflections.

2. In an open type body structure having a forward cowl section and a rear section, a door at each side of the vehicle adapted to structurally connect said sections, means for hinging each of said doors at one end thereof to one of said sections, means releasably connecting each of said doors at the other end thereof to the other of said sections, each of said doors having an inwardly extending bracing portion at its forward end, and means for releasably connecting each of said door bracing portions with said cowl section when said doors are closed so constructed and arranged as to brace said sections against relative lateral deflections, said door bracing portions being disposed at the tops of said doors and flared longitudinally inwardly in the direction of said cowl section connecting means.

3. In an open type body structure having a forward cowl section and a rear section, a door at each side of the vehicle adapted to structurally connect said sections, means for hinging each of said doors at one end thereof to one of said sections, means releasably connecting each of said doors at the other end thereof to the other of said sections, each of said doors having an upper edge formed with an inwardly extending bracing portion at its forward end, said cowl section having a rearwardly projecting bracing portion at each side thereof adapted for engagement with one of said door bracing portions, and means for releasably connecting each of said door bracing portions with one of said cowl section bracing portions when said doors are closed so constructed and arranged as to brace said body sections against relative lateral deflections.

4. In an open type body structure having a forward cowl section and a rear section, a door at each side of the vehicle adapted to structurally connect said sections, means for hinging each of said doors at one end thereof to one of said sections, means releasably connecting each of said doors at the other end thereof to the other of said sections, each of said doors having an upper edge formed with an inwardly extending bracing portion at its forward end, each of said door bracing portions being flared longitudinally inwardly toward said cowl section, said cowl section having an outwardly and rearwardly flared bracing portion at each side thereof adapted for engagement with one of said flared door bracing portions, and means for releasably connecting each of said flared door bracing portions with one of said cowl section flared bracing portions when said doors are closed so constructed and arranged as to brace said body sections against relative torsional deflections.

5. In an open type body structure having a forward cowl section and a rear section, a door at each side of the vehicle adapted to structurally connect said sections, means for hinging each of said doors at one end thereof to one of said sections, means releasably connecting each of said doors at the other end thereof to the other of said sections, each of said doors having an upper edge formed with an inwardly extending bracing portion at its forward end, each of said door bracing portions being flared longitudinally inwardly toward said cowl section, said cowl section having an outwardly and rearwardly flared bracing portion at each side thereof adapted for engagement with one of said flared door bracing portions, and means for releasably connecting each of said flared door bracing portions with one of said cowl section flared bracing portions when said doors are closed so constructed and arranged as to brace said body sections against relative torsional deflections, said flared portions of each of said doors and cowl section having arcuate meeting faces.

6. In an open type body structure having a forward cowl section and a rear section, a door at each side of the vehicle adapted to structurally connect said sections, means for hinging each of said doors at one end thereof to one of said sections, latching means connecting each of said doors at the other end thereof to the other of said sections, each of said doors having an inwardly extending bracing portion at its forward end, means for releasably connecting said door bracing portions with said cowl section when said doors are closed, said door bracing portions being respectively disposed at the tops of said doors, and additional vertically spaced releasable connecting means between one end of each of said doors and one of said body sections, said releasable connecting means acting when the doors are closed to torsionally brace said body sections against relative displacements.

7. In an open type body structure having a forward cowl section and a rear section, a door at each side of the vehicle adapted to structurally connect said sections, means for hinging each of said doors at one end thereof to one of said sections, latching means connecting each of said doors at the other end thereof to the other of said sections, each of said doors having an upper edge formed with an inwardly extending bracing portion at its forward end, said cowl section having a rearwardly projecting bracing portion at each side thereof adapted for engagement with one of said door bracing portions, and means for releasably connecting each of said door bracing portions with one of said cowl section bracing portions when said doors are closed so constructed and arranged as to brace said body sections against relative lateral deflections, said releasable connecting means for each of said door bracing portions including male and female tapered members, one carried by the door bracing portion and the other carried by the cowl section bracing portion, the door carrying member swinging on the axis of the door hinging means for interconnecting with the other of said members.

8. In a vehicle body structure of the character set forth, forward and rear body sections providing a passenger compartment, a swinging side door adapted to structurally connect said sections when closed, said door having an inwardly extending shoulder at its upper edge overhanging a portion of said compartment, and a plurality of means connecting said door at its opposite ends respectively to said sections when said door is closed, one of said connecting means including means for releasably structurally connecting said shoulder to one of said sections to provide lateral bracing between said body sections.

9. In a vehicle body structure of the character set forth, forward and rear body sections providing a passenger compartment, a swinging side door adapted to structurally connect said section when closed, said door having an inwardly extending shoulder at its upper edge overhanging a portion of said compartment, means for releasably structurally connecting said shoulder to one of said body sections to provide lateral bracing between said body sections, the last said body section having a shoulder overhanging a portion of said compartment and connected with said door shoulders through said connecting means when said door is closed, and means connecting said door when closed to the other of said body sections.

10. In a vehicle body structure of the character set forth, forward and rear body sections providing a passenger compartment, a swinging side door at each side of the vehicle adapted to structurally connect said sections when closed, said doors and one of said sections having inwardly extending bracing portions so constructed and arranged as to provide a constructive diagonal bracing laterally between said body sections, means releasably structurally connecting said door bracing portions with said body section bracing portion, and means connecting each of said doors when closed to the other of said body sections.

11. In a vehicle body structure of the character described, a cowl body section having an upper rearwardly projecting shelf brace, a rear body section providing a passenger compartment with said cowl section, a door hinged at one end to said rear section and having an upper edge formed with an inwardly projecting shelf brace at its other end, said shelf braces having substantially abutting complementary faces when said door is closed, and means adapted to releasably connect said shelf braces at said faces when said door is closed, said connecting means and shelf braces opposing relative torsional deflection between said body sections.

12. In a vehicle body structure of the character described, a cowl body section having an upper rearwardly projecting shelf brace, a rear body section providing a passenger compartment with said cowl section, a door hinged at one end to said rear section and having an upper edge formed with an inwardly projecting shelf brace at its other end, said shelf braces having substantially abutting complementary faces when said door is closed, means adapted to releasably connect said shelf braces at said faces when said door is closed, and additional releasable means adapted to rigidly connect the front end of said door below the shelf brace thereof with said cowl section, said releasable connecting means and door hinge acting to torsionally brace said body sections through said door and shelf braces.

HAROLD A. HICKS.
ALEXANDER G. HERRESHOFF.
ARTHUR A. BUCHNER.